July 6, 1926.

L. G. HILL 1,591,038

AUXILIARY GREASE GUN

Filed Feb. 27, 1925

INVENTOR
Louis G. Hill
BY
ATTORNEY

Patented July 6, 1926.

1,591,038

UNITED STATES PATENT OFFICE.

LOUIS G. HILL, OF MORENCI, MICHIGAN.

AUXILIARY GREASE GUN.

Application filed February 27, 1925. Serial No. 12,177.

The primary object of my invention is to provide an auxiliary grease gun on the end of a hose leading from a major grease gun for the filling of grease cups, or for use in injecting grease into containers that have small openings.

It is a further object of my invention to provide an auxiliary gun that will eject grease under pressure in order to pack the same into openings of small capacity.

It is another object of my invention to provide an auxiliary grease gun of simple and inexpensive construction that can be easily and quickly attached to, or removed from, the hose of a major grease gun.

With the above and other objects in view, my invention consists in the arrangement, combination and construction of the various parts of my improved device, as described in the specification, claimed in my claims and shown in the accompanying drawings, in which:

Figure 1:
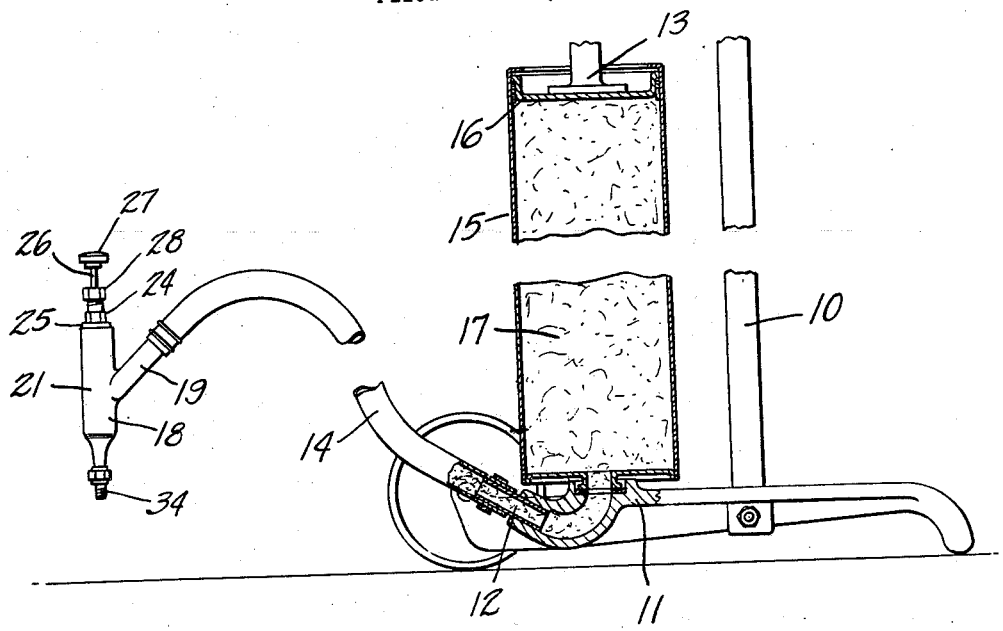
Fig. 1 is a front elevation of my improved device shown as attached to a major grease gun, the major gun being partly broken away and partly shown in section.
Figure 2:
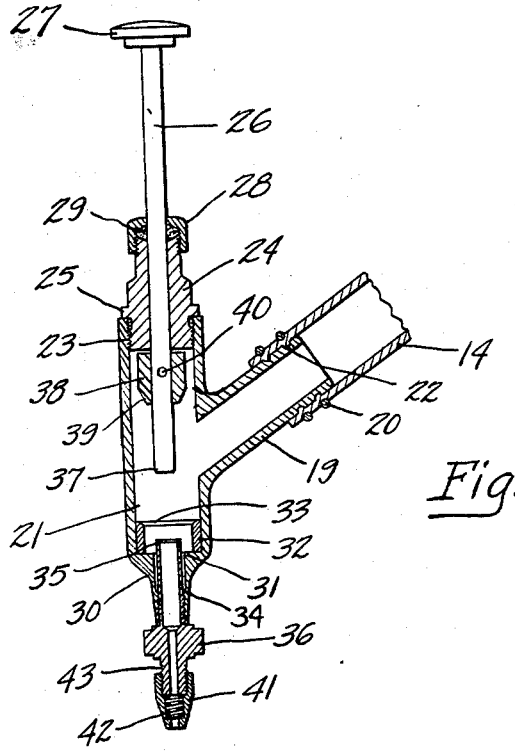
Fig. 2 is a front elevation of my improved device shown in section.

I have shown part of a grease gun 10 having the base 11, the outlet 12, the plunger 13 and the hose 14, one end of which is secured to the outlet 12.

The grease container 15 with the head 16 is placed between the plunger 13 and the base 11, so that pressure can be applied on the head 16 by the plunger 13, to force the grease 17 through the outlet 12 into the hose 14.

The specific construction of such a grease gun will be found in my co-pending application, filed November 16th, 1921, Serial No. 515,449.

My improved gun 18 that has the inlet 19 is secured to the free end of the hose 14 by fitting the inlet 19 inside the hose 14 and placing clamps 20, or other securing means, around the hose, so that the same will engage with the notches 22 on the inlet 19.

In the construction of my improved device, I provide a cylinder 21, into which is screw threaded, as at 23, the adapter 24, until the shoulder 25 thereof rests against the upper edge of the cylinder 21.

A plunger rod 26 with the head 27 thereon is fitted for reciprocation in the adapter 24.

The hollow nut 28 holds packing 29 around the rod 26, and is threaded to the head of the adapter 24.

The lower end of the cylinder 21 is exteriorly tapered as at 30, and a shoulder 31 is formed at about the same point, on the inside of the cylinder. A bushing 32 that has the beveled edge 33, is placed on the shoulder 31.

The flanged pipe coupling 34 that has one end 35 flanged and beveled, is fitted into the tapered end 30, so that the end 35 extends past the shoulder 31 and the flange 36 rests against the lower end of the cylinder 21. The plunger rod 26 has the rounded end 37 that is adapted to fit into the end 35 of the coupling 34 on the downward stroke of the rod 26. A plunger 38 with the beveled end 39, which is adapted to fit into the beveled edge 33 of the bushing 32, is secured on the rod 26 by the pin 40 so that the same will aid in forcing the grease to the outlet and also act as a stop on the up stroke of the plunger rod 26.

A tapered cap 41 with the spring 42 inserted therein is placed on the other end 43 of the coupling 34 so that the heavy grease will only be ejected when pressure is placed on the same.

In the practical use of my improved gun, grease is forced into the inlet 19, then into the cylinder 21 from the hose 14 under pressure from the plunger 13 of the major gun, and is constantly held under pressure by the said plunger 13. The plunger rod 26 then can be reciprocated up and down in the adapter 24 by means of the head 27. Thus, on each down stroke the grease that is in the cylinder 21, or at least a portion thereof, is forced through the pipe coupling 34 and is ejected from the cap 41.

The cap 41 is adapted to fit most lubricating nipples such as are used on automobiles (for which my invention is best suited) but other fittings may be substituted, adapted to meet the conditions in various systems, it being noted that the cap 41 is easily removable.

When it is desired to utilize the major grease gun for filling transmissions, rear axles and the like, where pressure introduction of the lubricant is not required, the coupling 34 is unscrewed and the tapered end 30 of the cylinder 21 used as the ordinary end of the hose 14. The plunger 38 with the beveled end 39 that can be fitted into the bushing 32, acts as a shut off valve to stop the flow of grease when the gun is put to this use.

Thus, it will be seen that I have provided a high pressure gun which may be used in conjunction with an ordinary grease gun and which accordingly never needs to be opened and refilled with lubricant. Additional lubricant may at all times be had by downward movement of the plunger 13 in the main lubricant container 15.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. An auxiliary grease gun consisting of a cylinder, an inlet and an outlet in said cylinder, an adapter secured to one end thereof a plunger rod fitted for reciprocation in said adapter, a pipe coupling fitted into the other end of said cylinder and adapted to receive one end of said rod on the downward stroke and a plunger on said rod to aid in ejecting grease from said outlet and to act as a stop for said plunger rod.

2. An auxiliary grease gun consisting of a cylinder, having a tapered end, a plunger rod, a pipe coupling fitted into said tapered end and adapted to receive part of said rod, and a tapered cap having a spring inserted therein, to prevent grease being ejected except under pressure, secured to one end of said coupling.

3. In combination, a grease container, a relatively large conduit leading from said container, means for forcing grease from said container through said conduit, a grease receiver on the free end of said conduit having a relatively large opening therein for the passage of grease, a beveled bushing in said opening, a plunger adapted for reciprocation in said receiver, a removable fitting in said passage having a reduced opening for the passage of grease, whereby said plunger may be operated to force grease through said reduced opening at high pressure, and grease may pass through said receiver under ordinary pressure from the container when said fitting is removed, said plunger and said beveled bushing being adapted to act as a stop valve when brought together.

4. In combination, a grease container, a hose, means for forcing grease from said container under pressure into said hose and an auxiliary grease gun secured to one end of said hose consisting of a cylinder having a tapered end adapted to receive grease from said hose, a plunger rod fitted for reciprocation in said cylinder, a plunger on said rod, a pipe coupling fitted into said tapered end and adapted to receive part of said rod, means for receiving a portion of said plunger and a tapered cap having a spring inserted therein to aid in preventing grease being ejected except under pressure.

LOUIS G. HILL.